United States Patent [19]
Bierlein et al.

[11] Patent Number: 5,028,107
[45] Date of Patent: Jul. 2, 1991

[54] OPTICAL ARTICLES FOR WAVELENGTH CONVERSION AND THEIR MANUFACTURE AND USE

[75] Inventors: John D. Bierlein, Wilmington; Daniel B. Laubacher, Greenville, both of Del.

[73] Assignee: E.I. Du Pont de Nemours and Company, Wilmington, Del.

[21] Appl. No.: 514,384

[22] Filed: Apr. 25, 1990

Related U.S. Application Data

[63] Continuation-in-part of Ser. No. 449,616, Dec. 12, 1989.

[51] Int. Cl.$^5$ .................. G02B 6/10; H03F 7/00; H01R 21/22
[52] U.S. Cl. ................. 350/96.12; 350/96.13; 350/96.14; 350/96.19; 350/311; 350/320; 350/96.34; 307/427; 307/430; 437/88; 437/148
[58] Field of Search .............. 350/96.10, 96.11, 96.12, 350/96.13, 96.14, 96.15, 96.19, 311, 320, 96.34; 307/425, 426, 427, 428, 430; 437/80, 88, 134, 138, 148

[56] References Cited

U.S. PATENT DOCUMENTS

| | | | |
|---|---|---|---|
| 3,831,038 | 8/1974 | Dabby et al. | 307/430 X |
| 3,842,289 | 10/1974 | Yariv et al. | 307/430 X |
| 3,949,323 | 4/1976 | Bierlein et al. | 332/7.51 |
| 4,231,838 | 11/1980 | Gier | 156/600 |
| 4,305,778 | 12/1981 | Gier | 156/623 R |
| 4,536,450 | 8/1985 | Garito | 428/411.1 |
| 4,740,265 | 4/1988 | Bierlein et al. | 156/624 |
| 4,766,954 | 8/1988 | Bierlein et al. | 156/624 |
| 4,792,208 | 12/1988 | Ullman et al. | 350/96.34 |
| 4,852,961 | 8/1989 | Yamamoto et al. | 350/96.19 |
| 4,865,406 | 9/1989 | Khanarian et al. | 350/96.12 |
| 4,886,339 | 12/1989 | Scozzafava et al. | 350/96.34 |
| 4,893,888 | 1/1990 | Okazaki et al. | 307/425 X |
| 4,923,277 | 5/1990 | Okazaki et al. | 307/430 X |
| 4,925,263 | 5/1990 | Sanford et al. | 350/96.12 |
| 4,955,977 | 9/1990 | Dao et al. | 350/96.34 |
| 4,981,337 | 1/1991 | Okamoto et al. | 307/425 X |

OTHER PUBLICATIONS
Sugi, Langmuir-Blodgett Filma-A Course Towards Molecular Electronics: A Review, Journal of Molecular Electronics, vol. I, 3-17 (1985).
Sohler, et al., IOO-ECOC'85, pp. 29-37.
Webjörn, et al., Journal of Nightwave Technology, (1989), vol. 7, No. 10, pp. 1597-1600.
R. G. Hunsperger, Integrated Optics: Theory and Technology (1984) pp. 38-43.
Armstrong, J. A. et al., "Interactions Between Night Waves in a Nonlinear Dielectric", Phys. Rev., 127, 1918 (1962).
Webjörn, et al., IEEE Photonics Tech. Lett., vol. 1, No. 10, pp. 316-318.
G. A. Magel, et al., Appl. Phys. Lett. 56(2), pp. 108-110.
Bierlein, et al., J. Opt. Soc. Am. B/vol. 6, No. 4, pp. 622-633 (1989).
Hopf, et al., Applied Classical Electrodynamics, vol. II, Nonlinear Optics, John Wiley & Sons, 1986, pp. 26-56.
Somekh, et al., Appl. Phys. Lett., vol. 21, No. 4, pp. 140-141 (1972).
M. J. Adams, An Introduction to Optical Waveguides, John Wiley & Sons, 1981, pp. 201-206.

Primary Examiner—Brian Healy

[57] ABSTRACT

Articles and process for wavelength conversion are disclosed which use a series of aligned sections of optical materials which are suitably balanced over the series with regard to the section length and the section $\Delta k$ (i.e. the difference between the sum of the propagation constants for the incident waves and the sum of the propagation constants for the waves generated). The sections are selected such that the sum for the series of the product of the length of each section with the $\Delta k$ is equal to about zero, and the length of each section is less than its coherence length. Embodiments are disclosed wherein at least one of the optical materials is optically nonlinear and/or wherein a layer of nonlinear optical material is provided adjacent to the series of sections. Also disclosed is a process for preparing a channel waveguide for wavelength conversion systems wherein areas along a portion of a crystal substrate surface used for forming the desired channel are alternately masked and unmasked during cation replacement by immersion in a molten salt.

26 Claims, 3 Drawing Sheets

OPTICAL ARTICLES FOR WAVELENGTH CONVERSION AND THEIR MANUFACTURE AND USE

This application is a continuation-in-part of U.S. patent application Ser. No. 07/449,616 filed Dec. 12, 1989.

FIELD OF THE INVENTION

This invention relates to optical articles and more particularly to optical articles useful for wavelength conversion.

BACKGROUND OF THE INVENTION

Considerable effort has recently been directed toward developing optical systems such as communication systems using optical waves. A challenge often encountered in the design of such systems is the efficient generation of optical waves with wavelengths which are particularly suitable for use in such systems. For example, while efficient laser generating of infrared waves is commonly available, the direct generation of certain more desirable waves having shorter wavelengths is often considerably more difficult.

One approach to providing waves with more desirable wavelengths has been wavelength conversion whereby articles containing an optical medium are used to at least partially convert optical waves incident to the medium to optical waves having a different wavelength. For example, a frequently used wavelength conversion process involves second harmonic generation where an incident optical wave is directed through a medium (e.g., a nonlinear crystal) in which optical waves having wavelengths corresponding to the second harmonic of the wavelength of the incident optical wave are generated by interaction between the medium and the optical waves.

Typically in optical articles for wavelength conversion, waves of suitable wavelength are generated over the length of the medium. It is well known in designing such articles that unless means are provided for inhibiting destructive interference between the waves generated at various points along the medium length, the efficiency of wavelength conversion schemes such as second harmonic generation can be severely limited. Accordingly, there is generally a need to employ some technique to control the effects of such destructive interference.

In somewhat more theoretical terms, wavelength conversion systems may be generally addressed in terms of a propagation constant k for each of the interacting optical waves in the conversion medium. For the purposes of this description, k for each optical wave may be defined as equal to $2\pi n/\lambda$, where n is the refractive index of the medium and $\lambda$ is the wavelength of the wave. In view of the inverse relationship between the propagation constant and the wavelength, and the fact that the refractive index can be different for optical waves of different frequencies, the propagation constant for each of the interacting optical waves in the conversion medium can clearly be different.

Generally, for wavelength conversion the sum of frequencies of the interacting incident waves is equal to the sum of the frequencies of the waves generated by the interaction. To minimize the destructive interference between waves generated in the medium, it has generally been considered desirable that the sum of the propagation constants of the interacting incident waves also closely approximate the sum of the propagation constants of the waves generated by the interaction. In other words, for the optical waves involved in the wavelength conversion, it has been considered desirable for efficient wavelength conversion that the difference between the total propagation constants for the incident waves in the medium and the total propagation constants for the waves generated in the medium (i.e., the $\Delta k$ for the medium) be about zero. Adjusting a wavelength conversion system to a condition where $\Delta k$ is about zero is known as phase matching.

An optical parameter of some interest in wavelength conversion systems for a particular medium is the coherence length, coh, which is generally defined as $$\frac{2\pi}{\Delta k}.$$

For conditions where $\Delta k$ is about zero, it is evident that the corresponding coh is relatively large.

For purposes of further illustration, in a normal phase matching process involving the nonlinear interaction of three beams in a crystal system where two beams of incident optical waves having respective frequencies $\omega_1$ and $\omega_2$ and respective wavelengths $\lambda_1$ and $\lambda_2$ are directed through a medium (e.g., a crystal or a composite material) having a refractive index $n(\omega)$ which varies as a function of the optical wave frequency, to generate optical waves having a frequency $\omega_3$ and a wavelength $\lambda_3$, a beam propagation constant k is defined for each wave beam as equal to $2\pi n(\omega)/\lambda$, and a $\Delta k$ for the crystal system is represented by the relationship:

$$\Delta k = \frac{2\pi n(\omega_3)}{\lambda_3} - \frac{2\pi n(\omega_2)}{\lambda_2} - \frac{2\pi n(\omega_1)}{\lambda_1}.$$

The maximum output intensity occurs in such a system when under conditions where the phase system is matched (i.e., $\Delta k$ is zero). The intensity of output for a phase matched system generally increases in proportion to $h^2$, the square of the crystal length, h.

For second harmonic generation systems the frequencies $\omega_1$ and $\omega_2$ are taken as equal and as one half of the frequency $\omega_3$. Accordingly, the wavelengths $\lambda_1$ and $\lambda_2$ are twice the wavelength $\lambda_3$ and $\Delta k$ for second harmonic generation systems may be represented in terms of the above example, by the relationship:

$$\Delta k = \frac{2\pi}{\lambda_3}(n(\omega_3) - n(\omega_1)).$$

The coherence length for such second harmonic generation systems may thus be represented by the relationship:

$$coh = \frac{\lambda_3}{n(\omega_3) - n(\omega_1)} = \frac{0.5\lambda_1}{n(\omega_3) - n(\omega_1)}.$$

An alternate example of a wave conversion scheme involves generating two waves with wavelengths $\lambda_5$ and $\lambda_6$ from a single input wave of wavelengths $\lambda_4$.

Several techniques have been demonstrated or proposed for achieving efficient phase matching. (See, for example, F. A. Hopf et al., Applied Classical Electrodynamics, Volume II, Nonlinear Optics, John Wiley & Sons, 1986, pp. 29-56.) The most common of these are the angle and temperature tuning techniques used in nearly all current applications such as second harmonic generation and sum and difference frequency generation. In angle tuning of bulk material such as a single crystal, the orientation of the crystal relative to the incident light is adjusted to achieve phase matching. The technique is generally considered inappropriate for use in articles such as waveguides which by nature of their design must be oriented in a particular direction with regard to incident waves. Temperature tuning relies on the temperature dependence of the birefringence of the material and may be used for waveguides as well as bulk material. However, for many materials the temperature dependence of the birefringence is large and, although temperature tuning is possible for waveguides in these materials, a high degree of temperature control must be provided (e.g., ±1° C.). In optical materials where the temperature dependence of the birefringence is small (e.g., $KTiOPO_4$), although a high degree of temperature control is necessary, the range of wavelengths over which temperature tuning is possible for waveguides is small.

Phase matching for second harmonic generation using periodic variations in the refractive index to correct for the fact that $\Delta k$ is not equal to 0, can be accomplished by reflecting back both the fundamental and second harmonic beams in such a way that the reflected beams are phase matched (see, for example, S. Somekh, "Phase-Interchangeable Nonlinear Optical Interactions in Periodic Thin Films," Appl. Phys. Lett., 21, 140 (1972)). As with the methods above, the intensity of the second harmonic output increases with the square of the length of the material used. However, since only a small fraction of the beams are reflected, the overall efficiency of this method is even less than the methods discussed above.

Other "quasi" phase matching techniques have been demonstrated which involve periodic domain reversals or internal reflection (see J. A. Armstrong et al., "Interactions between Light Waves in a Nonlinear Dielectric", Phys. Rev., 127, 1918 (1962)). For example, Hopf et al., supra, discloses at page 52 segments of nonlinear optical material where the nonlinear optical coefficient is modulated at a period equal to the coherence length for the waves in the material.

Other modulated waveguide schemes have been described in the art which can give phase matching by using lengths of adjacent materials which are equal to the coherence length. However, these periodically modulated schemes can be very sensitive to waveguide parameters, such as waveguide depth and modulation period, and are not highly efficient with respect to conversion.

There remains a need for wavelength conversion schemes for efficiently converting fundamental optical waves to useful alternate wavelengths.

SUMMARY OF THE INVENTION

This invention is based on the discovery that wavelength conversion can be accomplished by using a series of sections of optical materials wherein the differences in the refractive indices and the section lengths are balanced to control the effects of destructive interference through the series such that the optical waves are phase matched at the end of the series even though they are not phase matched in the individual sections. Balancing the section lengths and refractive indices requires that the length of each section (i.e., $h_i$) is less than its coherence length $$\left( \text{i.e., } \frac{2\pi}{\Delta k_i} \right)$$

for the wavelength conversion system; and that the refractive indices of the sections be such that the sum for the series of the product of the length and $\Delta k$ for each section (i.e., $\Delta k_i$) is equal to about zero (i.e., $\Sigma_i \Delta k_i h_i \approx 0$).

A process for wavelength conversion is provided in accordance with this invention which comprises the step of directing the incident optical waves for wavelength conversion through a series of aligned sections of optical materials for wavelength conversion, said sections being selected such that the sum for the series of sections of the product of the length of each section in the direction of alignment (i.e., $h_i$) and the $\Delta k$ for that section (i.e., $\Delta k_i$) is equal to about zero, (i.e., $\Sigma_i \Delta k_i h_i \approx 0$) and such that the length of each section is less than its coherence length $$\left( \text{i.e., } \frac{2\pi}{\Delta k_i} \right).$$

The $\Delta k$ for each section is the difference between the sum of the propagation constants for the incident waves for the wavelength conversion system in that section and the sum of the propagation constant for the generated waves for the wavelength conversion system in that section; and the coherence length for each section is $$\frac{2\pi}{\Delta k}$$

for that section. The process may be used to generate beams having a certain wavelength from two incident beams. Alternatively, the process may be used to generate two beams from one incident beam. A preferred use of the wavelength conversion process, however, is for second harmonic generation, wherein the generated waves have a wavelength which is one-half the wavelength of the incident beams. Generally, either at least one of the section materials is optically nonlinear, or a layer of nonlinear optical material is provided adjacent to the series of sections during wavelength conversion, or both.

Optical articles are provided in accordance with this invention for use in a wavelength conversion system. The articles comprise at least one optical conversion segment consisting of a series of aligned sections of optical materials for wavelength conversion, wherein said sections are selected so that the sum of the product of the length of each section (i.e., $h_i$) and the $\Delta k$ for that section (i.e., $\Delta k_i$) is equal to about zero, (i.e., $\Sigma_i \Delta k_i h_i \approx 0$) and the length of each section is less than its coherence length (i.e., $2\pi/\Delta k_i$). Optionally, the optical article further comprises a layer of nonlinear optical material adjacent to said optical conversion segment. Embodiments are provided in accordance with this invention wherein at least one of the section materials is nonlinear; wherein each section is constructed of nonlinear optical material; and wherein the sections are constructed of optically linear material and/or of optically nonlinear material and a layer of nonlinear optical material is provided adjacent to the optical conversion segment. Preferred optical materials are crystal materials of the formula $K_{1-x}Rb_xTiOMO_4$, where x is from 0 to 1, and M is P or As, and single crystal materials of said formula where the cations of said formula are partially replaced by at least one of $Rb^+$, $Tl^+$ and $Cs^+$.

For a segment having p sections of respective lengths $h_1, h_2, \ldots h_i, \ldots h_p$ characterized as having a series of propagation constants $k_1, k_2, \ldots k_i, \ldots k_p$ for each of the optical waves in the wavelength conversion system wherein $k_i = 2\pi n_i(\omega)/\lambda$, and $n_i(\omega)$ and $\lambda$ are respectively the refractive index in the section and wavelength, a $\Delta k$ is provided for each section which corresponds to the difference between the total propagation constants for the incident waves for the wavelength conversion system in the section and the total propagation constants for the generated waves for the wavelength conversion system in the section. In accordance with this invention, the sections for each segment are selected so that the sum $\Delta k_1 h_1 + \Delta k_2 h_2 + \ldots \Delta k_i h_i + \ldots \Delta k_p h_p$ for the segment (i.e., the sum $h_i \Delta k_i$ for the series, or $\Sigma_i \Delta k_i h_i$) is equal to about zero, and each section length $h_i$ is less than $$\frac{2\pi}{\Delta k_i}.$$

A preferred embodiment involves second harmonic generation wherein at least one of the materials in the series has a nonlinear optical coefficient which is non-zero.

Certain embodiments are provided where the p sections may be characterized as either one segment having q adjacent section pairs (i.e., p=2q) wherein the sum $\Delta k_{i-1} h_{i-1} + \Delta k_i h_i$ for each pair is about zero, or q adjacent segments of 2 sections each wherein in each segment the sum $\Delta k_1 h_1 + \Delta k_2 h_2$ is about zero.

Channel waveguides constructed in accordance with this invention can be used to improve optical waveguide devices which comprise at least one channel waveguide, means to couple an incoming optical wave into said channel waveguide and means to couple an outgoing wave out of said channel waveguide.

This invention further provides a process for preparing an optical article. One process for preparing a channel waveguide for a wavelength conversion system in accordance with this invention comprises the steps of: (1) providing a z-cut substrate of single crystal material having the formula $K_{1-x}Rb_xTiOMO_4$ wherein x is from zero to one and M is P or As, said substrate including an optically smooth surface with a selected portion at which it is suitable to form a channel waveguide; (2) providing a molten salt containing cations selected from the group consisting of $Rb^+$, $Cs^+$ and $Tl^+$ in an amount efficient to provide upon exposure to said waveguide portion at a selected temperature for a selected time sufficient cation replacement to change the index of refraction with respect to the index of refraction of said substrate; (3) applying a masking material on said substrate to provide a pattern of aligned areas along said waveguide portion of said optically smooth surface which are alternately masked with a material resistant to said molten salt and unmasked (the lengths of said masked and unmasked areas being suitably selected to provide phase matching in accordance with this invention); (4) immersing said masked substrate in said molten salt at said selected temperature for said selected time, thereby providing cation replacement in said unmasked areas; (5) removing the masking material from said substrate; and (6) finishing said substrate to provide a clean waveguide with polished waveguide input and output faces.

DETAILED DESCRIPTION OF THE INVENTION

Figure 1:
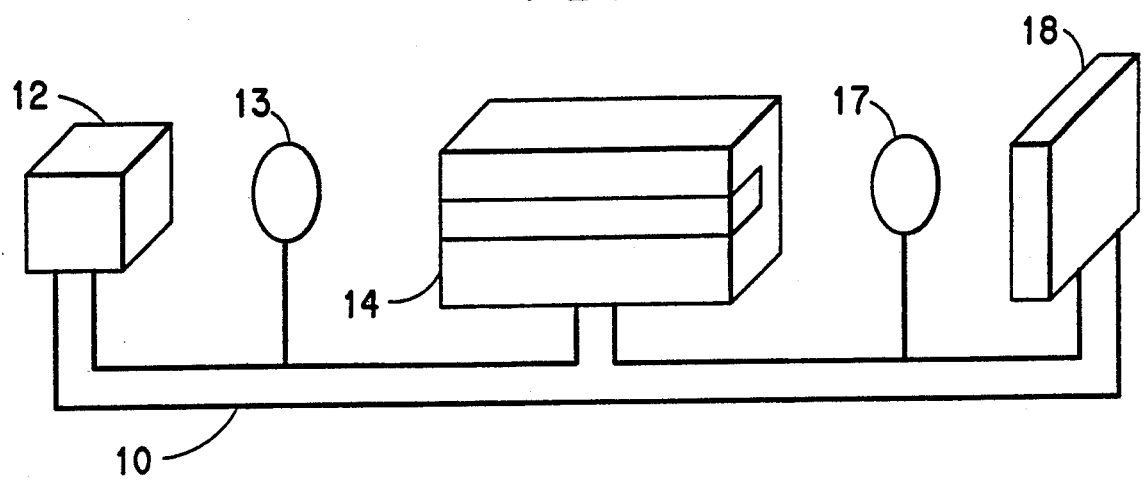
FIG. 1 is a schematic drawing of an apparatus for wavelength conversion in accordance with this invention.

In accordance with this invention means are provided which are suitable for at least partially converting optical waves having one wavelength, into optical waves of a different wavelength. In general, during wavelength conversion the sum of the frequencies of the incident waves and the sum of the frequencies of the generated waves is equal. Accordingly, for wavelength conversion systems where waves of frequency $\omega_1$ and wavelength $\lambda_1$ are used along with waves of frequency $\omega_2$ and wavelength $\lambda_2$ to generate waves of frequency $\omega_3$ and wavelength $\lambda_3$, $\omega_3$ is equal to the sum of $\omega_1$ and $\omega_2$; and for wavelength conversion systems where waves of frequency $\omega_4$ and wavelength $\lambda_4$ are used to generate waves of frequency $\omega_5$ and wavelength $\lambda_5$ along with waves of frequency $\omega_6$ and wavelength $\lambda_6$, $\omega_4$ is equal to the sum of $\omega_5$ and $\omega_6$.

A process for wavelength conversion is provided in accordance with this invention which comprises the step of directing the incident optical waves for wavelength conversion through a series of aligned sections of optical materials for wavelength conversion, said sections being selected such that the sum for the series of sections of the product of the length of each section in the direction of alignment and the $\Delta k$ for that section is equal to about zero, and the length of each section is less than its coherence length. As further discussed below $\Delta k$ for each section is the difference between the sum of the propagation constants for the incident waves for the wavelength conversion system in that section and the sum of the propagation constant for the generated waves for the wavelength conversion system in that section, and the coherence length for each section is $$\frac{2\pi}{\Delta k}$$

for that section. The process may be used to generate beams having a certain wavelength from two incidental beams. Alternatively, the process may be used to generate two beams from one incident beam. A preferred use of the wavelength conversion process, however, is for second harmonic generation, wherein the generated waves have a wavelength which is one-half the wavelength of the incident beams.

The optical articles of this invention for use in a wavelength conversion system comprise at least one optical conversion segment consisting of a series of aligned sections of optical materials for wavelength conversion. The series may be represented as a plurality of p aligned adjacent sections of optical materials, $m_1$, $m_2, \ldots m_i, \ldots m_p$. Each section has by a length $h_i$ in the direction of alignment and a refractive index $n_i(\omega)$ which varies as a function of frequency $\omega$ of the optical waves passing therethrough. The difference between the total propagation constant of the incident waves for each aligned section and the total propagation constants for the waves generated for each of the aligned sections defines a $\Delta k_i$ for the section. In accordance with this invention, the sections for each of said segments are selected so that the sum of the product of $\Delta k$ for a section and the length h for said section over the segment (i.e., $\Delta k_1 h_1 + \Delta k_2 h_2 + \ldots \Delta k_i h_i + \ldots \Delta k_p h_p$) is equal to about zero; and each $h_i$ is less than $$\frac{2\pi}{\Delta k_i}.$$

It is desirable that the $\Sigma_i \Delta k_i h_i$ be as close to zero as practical. It should be understood, however, that perfect balance of the optical characteristics and section lengths is difficult to achieve, and that the advantages of this invention can be achieved so long as $\Sigma_i \Delta k_i h_i$ is maintained in the range of about zero: that is the overall coherence length over the entire wavelength conversion path is greater than the length of the wavelength conversion path itself. An approach to designing wavelength conversion paths to achieve this balance is to actually calculate the $\Delta k$ and section length for each section. In this approach, an advantageous balance is considered to occur when the sum over the entire wavelength conversion path of the products of the $\Delta k$ of each section with the length for that section has an absolute value less than $2\pi$. Preferably the resulting total of said product over the wavelength conversion path is less than $3\pi/2$; and most preferably it is less than $\pi$.

Accordingly, for optical articles of this invention having a number (N) of optical conversion segments in sequence, with the segments 1, 2, ... and N respectively having $p_1$, $p_2$, ... and $p_N$ sections, it is desirable that each segment be designed such that $\Sigma_i \Delta k_i h_i$ for the wavelength conversion system segment has an absolute value less than $2\pi/N$, so that the sum of the product of $\Delta k$ with section lengths for the total number of sections, $p_1 + p_2 + \ldots + p_N$, in the wavelength conversion path remain about zero in the sense described above (i.e., has an absolute value less than $2\pi$). Preferably, $\Sigma_i \Delta k_i h_i$ for each segment has an absolute value less than $1.5\pi/N$, and most preferably $\Sigma_i \Delta k_i h_i$ has an absolute value less than $\pi/N$.

Figure 6:
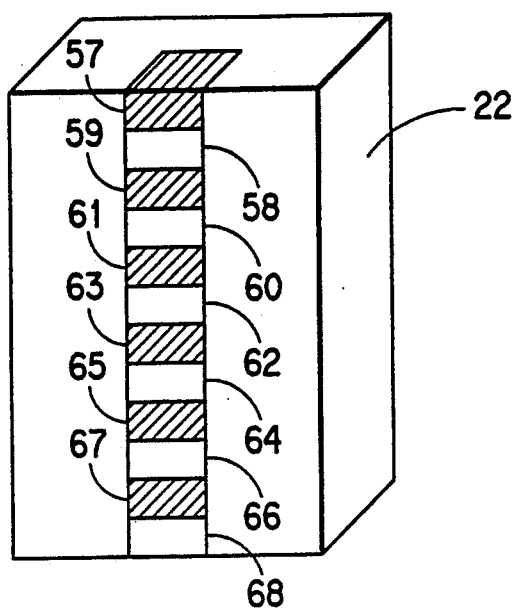
FIG. 6 is a Perspective view of another waveguide for waveguide conversion in accordance with this invention.

Use of this approach may be exemplified by reference to the optical article in accordance with this invention in the form of a waveguide as illustrated in FIG. 6. In FIG. 6, a single crystal of $KTiOPO_4$ (22) has a series of sections including a plurality of aligned sections (57), (59), (61), (63), (65), and (67) of $KTiOPO_4$ wherein the cations have been partially replaced $Rb^+$ alternating with a plurality of aligned sections (58), (60), (62), (64), (66) and (68) of $KTiOPO_4$ wherein the cations have been partially replaced either by $Tl^+$ or by a mixture of $Rb^+$ and $Tl^+$. In this embodiment rubidium and/or thallium cation substitution in $KTiOPO_4$ in the manner shown insure substantially complete guidance of the wave on the optical path through the waveguide.

The sections in FIG. 6 are sized such that the optical article has a first optical conversion segment represented by the aligned sections (57) and (58); a second optical conversion segment represented by aligned sections (59) and (60); a third optical conversion segment represented by aligned sections (61) and (62); a fourth optical conversion segment represented by aligned sections (63) and (64); a fifth optical conversion segment represented by aligned sections (65) and (66); and a sixth optical conversion segment represented by aligned sections (67) and (68). Thus, in this simple illustrative case the number of optical conversion segments, N, is 6 and the number of sections for each segment, p, is 2. The summation of the product of the $\Delta k$ times the length of each section over all of the six optical conversion segments must have an absolute value less than $2\pi$ and to ensure this, the summation of the product of the $\Delta k$ times the length of each section for each one of the six optical conversion segments preferably has an absolute value of less than $2\pi/N$ (i.e., in this simple case, less than $\pi/3$). One can see that as the number of optical conversion segments in the optical path grows the summation of the product of the $\Delta k$ times the length of each section for each of the optical conversion segments must have an absolute value approaching 0. As a practical matter the number of optical conversion segments along the optical path can be on the order of hundreds so that the zero product summation is approached.

As a practical matter, in many cases because of limitations on the precision associated with preparing a series of sections for use in this invention (including preparing the optical materials themselves) one may wish to confirm that the desired balance or the $\Delta k$'s and section lengths have been achieved by observing that the overall coherence length over the entire wavelength conversion path is greater than the length of said path. In some cases, one can observe the overall coherence length directly from examination of the weak scattering of waves along the length of the wavelength conversion path.

Clearly, for $\Sigma_i \Delta k_i h_i$ to be about zero, the $\Delta k$ for a portion of the sections of the series must be of a different sign than the $\Delta k$ for other sections (i.e., at least one $\Delta k$ must be positive and at least one $\Delta k$ must be negative). Indeed a process for wavelength conversion is provided in accordance with this invention which comprises the step of directing the incident optical waves for wavelength conversion through a wavelength conversion path having a series of aligned sections of optical materials for wavelength conversion; at least one of said optical materials having a $\Delta k$ which is positive for said wavelength conversion; at least one of said optical materials having a $\Delta k$ which is negative for said wavelength conversion; and the series of sections being selected such that the sum of the products of the lengths of each section of material having a positive $\Delta k$ with its $\Delta k$ is balanced with the sum of the products of the lengths of each section of material having a negative $\Delta k$ with its $\Delta k$ so that the overall coherence length over the wavelength conversion path is greater than the length of the wavelength conversion path. Preferably, for efficient wavelength conversion, a section having a $\Delta k$ of one sign should be adjacent to at least one section having a $\Delta k$ of the opposite sign.

For example, in a section wherein two beams of incident optical waves having respective frequencies $\omega_1$ and $\omega_2$ and respective wavelengths $\lambda_1$ and $\lambda_2$ are directed through a medium (e.g., a crystal or a composite material) having a length $h_i$ and having a refractive index $n_i(\omega)$ which varies as a function of the optical wave frequency, to generate optical waves having a frequency $\omega_3$ and a wavelength $\lambda_3$, a beam propagation constant k is defined for each wave beam as equal to $2\pi n(\omega)/\lambda$, and a $\Delta k_i$ for the section is represented by the relationship:

$$\Delta k_i = \frac{2\pi n_i(\omega_3)}{\lambda_3} - \frac{2\pi n_i(\omega_1)}{\lambda_1} - \frac{2\pi n_i(\omega_2)}{\lambda_2}.$$

In accordance with the process of this invention, the incident optical waves of such wavelength conversion systems (having frequencies $\omega_1$ and $\omega_2$) are directed through a series of sections selected such that the sum of $h_i \Delta k_i$ for the series is equal to about zero. The optical conversion segments for optical articles using such wavelength conversion systems consisting of a series of sections selected such that the sum of $h_i \Delta k_i$ for the series is about zero.

In the case of second harmonic generation, $\omega_1$ and $\omega_2$ are equal and are each one-half of $\omega_3$. Accordingly, for second harmonic generation, the $\Delta k_i$ for each section may be represented by the relationship:

$$\Delta k_i = \frac{2\pi}{\lambda_3} (n(\omega_3) - n(\omega_1)).$$

Alternatively, in a section where a beam of incident optical waves having a frequency $\omega_4$ and wavelength $\lambda_4$ is directed through a medium having a length $h_i$ and having a refractive index $n_i(\omega)$ which varies as a function of the optical wave frequency, to generate two beams of optical waves having respective frequencies $\omega_5$ and $\omega_6$, and respective wavelengths $\lambda_5$ and $\lambda_6$, a beam propagation constant $k_i$ is defined for each wave beam as equal to $2\pi n_i(\omega)/\lambda$, and a $\Delta k_i$ for that section is represented by the relationship:

$$\Delta k_i = \frac{2\pi n_i(\omega_6)}{\lambda_6} - \frac{2\pi n_i(\omega_5)}{\lambda_5} - \frac{2\pi n_i(\omega_4)}{\lambda_4}.$$

In accordance with the process of this invention, the incident optical waves of such wavelength conversion systems (having frequency $\omega_4$) are directed through a series of sections such that the sum of $h_i \Delta k_i$ for the series is equal to about zero. The optical conversion segments for optical articles using such wavelength conversion systems consist of a series of sections selected such that the sum of $h_i \Delta k_i$ for the series is about zero.

In any case, a coherence length $coh_i$ is defined for each section by the equation:

$$coh_i = \frac{2\pi}{\Delta k_i}.$$

In accordance with the process of this invention, each of the sections in the series through which the incident optical waves of the wavelength conversion system are directed has a length $h_i$ which is less than its coherence length $coh_i$. The optical conversion segments for optical articles using such wavelength conversion systems consist of sections having lengths $h_i$ which are less than their respective coherence lengths $coh_i$.

For certain embodiments of this invention the p sections of optical materials may be characterized as q pairs of adjacent sections of optical materials, $m_1$ and $m_2$, $m_3$ and $m_4$, ... $m_{i-1}$ and $m_i$, ... $m_{2q-1}$ and $m_{2q}$ (i.e., p=2q) each section being characterized by corresponding lengths, $h_1$, $h_2$, ... $h_i$, ... $h_{2q}$, corresponding refractive indices, $n_1$, $n_2$, ... $n_i$, ... $n_{2q}$ and corresponding propagation constants associated with each wavelength of the wavelength conversion system, $k_1$, $k_2$, ... $k_i$, ... $k_p$, and the materials are selected so that for each pair of sections of material $m_{i-1}$ and $m_i$ the sum of $\Delta k_{i-1} h_{i-1}$ and $\Delta k_i h_i$ is about zero. In this case phase matching occurs at the end of the first pair, at the end of the second pair, etc. Segments may be used in series; and accordingly, an optical article (e.g., a waveguide) comprising a segment wherein the sections are paired as above may also be viewed as using a q adjacent segments of 2 sections each (i.e., N=q).

In general, the lengths, $h_1$, $h_2$, ... $h_i$, ... $h_p$ are much less than the coherence length and typically are each in the range of 0.25 to 50 $\mu$m and are often each 1 $\mu$m or more. In practice, the ratio of adjacent section lengths (i.e., $h_{i-1}:h_i$) is usually in the range of 1:20 to 20:1. Typical section widths are between about 0.2 $\mu$m and 50 $\mu$m and typical section depths are between about 0.1 $\mu$m and 50 $\mu$m.

Both linear and nonlinear materials can be used in accordance with this invention. In certain embodiments at least one section of each segment has a non-zero nonlinear optical coefficient. Typically each section will be constructed of nonlinear optical materials.

Preferred optical materials for the optical articles of this invention for use in a wavelength conversion system include crystalline materials selected from single crystal material having the formula $K_{1-x}Rb_xTiOMO_4$, where x is from 0 to 1 and M is selected from the group consisting of P and As and single crystal materials of said formula where the cations of said formula are partially replaced by at least one of $Rb^+$, $Tl^+$ and $Cs^+$. For practical reasons, when using materials of said formula wherein the cations have been partially replaced and x is about 0.8 or more, the replacement cations preferably include $Cs^+$, $Tl^+$ or both $Cs^+$ and $Tl^+$. As indicated by U.S. Pat. No. 4,766,954 the use of divalent ions (e.g., $Ca^{++}$, $Sr^{++}$ and $Ba^{++}$) with $Rb^+$, $Cs^+$ and/or $Tl^+$ ions can provide a wide degree of control of refractive index. The divalent ions, as well as $Rb^+$, $Cs^+$ and/or $Tl^+$ ions can exchange with the monovalent cations of substrate material (e.g., the $K^+$ ions of a $KTiOPO_4$ substrate). Examples of articles using the materials of this invention include an article having a single crystal of $KTiOPO_4$ which has been modified (e.g., by cation exchange) to provide a waveguide of sequential sections of $KTiOPO_4$ and sections of $K_{1-x}Rb_xTiOMO_4$ is not zero, and an article having a single crystal of $KTiOPO_4$ which has been modified to provide a waveguide of sequential sections of $KTiOPO_4$ and sections of $KTiOPO_4$ where the cations are partially replaced by a mixture of $Rb^+$ and $Tl^+$ ions or a mixture of $Rb^+$, $Tl^+$ and $Ba^{++}$ ions.

Optionally, a layer or film (e.g., an oriented Langmuir-Blodgett film) of nonlinear optical material may also be provided adjacent to the segment to allow interaction using the evanescent component of optical waves. An additional embodiment of this invention is a waveguide or other optical article, where $\Sigma_i \Delta k_i h_i$ is about zero and none of the optical materials of construction are nonlinear per se, i.e., have a nonlinear optical coefficient which is not equal to zero. In this case, phase matched wavelength conversion is obtained in accordance with the invention by coupling the evanescent component of the incident began into an adjacent layer of nonlinear optical material and coupling back the evanescent component of the waves generated in said nonlinear optical material.

Selection of optical materials of construction and design parameters such as section width and depth enables the production of optical articles having the desired nonlinear optical properties and substantial conversion efficiency without extreme sensitivity to processing parameters such as temperature, time, and depth of waveguide. For example, the section depth for waveguides of a particular material may be selected so that the $\Delta k$ of the section is relatively insensitive to processing conditions such as temperature.

There is believed to be actually no theoretical limit as to how many sections of optical materials make up the optical article, as long as the length of each section is less than its coherence length and as long as for each segment $\Sigma_i \Delta k_i h_i$ is about zero. For waveguides, the number of sections provided can depend on such factors as the optical materials used and the waveguide length. A range of about 400 to 1000 sections can be provided in a typical 5.0 mm long waveguide. Longer waveguides can have up to 10,000 sections, or even more. However, articles comprising optical conversion segments of only two sections are also considered to be within the scope of this invention.

Another example of optical elements using a linear material such as yttrium aluminum garnet (i.e., YAG or $Y_5Al_5O_{12}$) or $Al_2O_3$ uses a single crystal fiber grown with different orientations, with the orientation changing so that the $\Sigma_i \Delta k_i h_i$ is about zero condition is met. Then, wavelength conversion can be achieved by propagating the fundamental beam down the fiber and having the fringing fields interact with an oriented nonlinear film or layer in optical contact with the fiber, as in a Langmuir-Blodgett film. Another example of an optical element in accordance with the invention is one formed as a series of platelets stacked one on another of a nonlinear birefringent material, such as $LiNbO_3$ or 3-methyl-4-methoxy nitrostilbene, where the plates are alternately oriented (e.g., in orientation a or orientation b) such that $\Delta k_a h_a + \Delta k_b h_b$ is about zero. Another form of this optical element embodies platelets of nonlinear material (i.e., $m_a$) oriented in the same direction and separated by a linear transparent film or adhesive material (i.e., $m_b$) such that $\Delta k_a h_a + \Delta k_b h_b$ is about zero, where a refers to the platelet and b refers to the transparent film or adhesive.

The invention may be employed for waveguide structures, bulk applications and under certain circumstances, for mixed guided and unguided wave systems. In mixed systems, each unguided length in the wave propagation direction should be less than the defocusing length of the wave in the material to minimize radiation losses between the guide sections.

The instant invention may be used to improve an optical waveguide device comprising at least one channel waveguide, means to couple an incoming optical wave into said channel waveguide and means to couple an optical outgoing optical wave out of said channel waveguide. The device is improved by using an article in accordance with this invention as the waveguide therein.

Employment of the instant invention is illustrated by reference to the apparatus (10) shown in FIG. 1 wherein optical waves emitted by laser (12) at one wavelength may be used to generate waves at another wavelength. Lens (13) is used to focus the optical waves emitted by laser (12) into a waveguide (14) constructed in accordance with this invention. Wavelength conversion occurs within the waveguide (14) and a second lens (17) is provided to collimate the optical waves emerging from the waveguide. A filter (18) is provided in the arrangement shown to filter out the remaining optical waves which have the wavelength of the emitted waves, while allowing the optical waves of the desired wavelength which were generated within the waveguide (14) to pass through. Thus, for example, if laser (12) is a Nd YAG laser used to generate polarized light at wavelength 1.06 $\mu$m, and the waveguide (14) is constructed in accordance with this invention for second harmonic generation using such incident light, the filter (18) would be adapted to allow optical waves of wavelength 0.53 $\mu$m to pass through while optical waves of wavelength 1.06 $\mu$m are filtered from the collimated beam which emerges from the waveguide. A device incorporating the apparatus of FIG. 1 (i.e. the laser (12), the waveguide (14), the filter (18), and the lenses (13) and (17)) is considered to be an article within the scope of this invention. Indeed, waveguides such as waveguide (14) are themselves considered to be articles within the scope of the invention.

Figure 2:
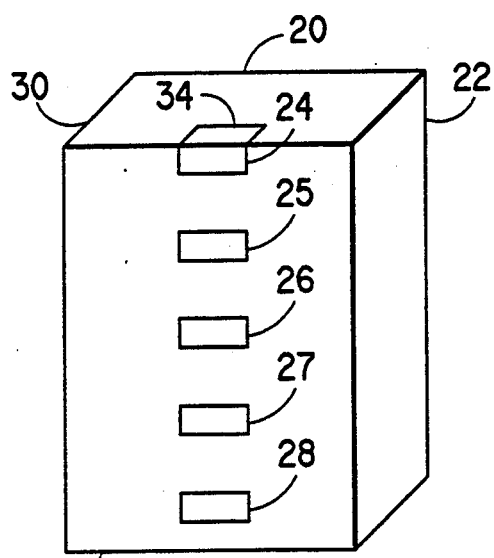
FIG. 2 is a perspective view of a waveguide for wavelength conversion in accordance with this invention.

One embodiment of a waveguide of the instant invention is shown by the waveguide for second harmonic generation illustrated at (20) in FIG. 2. The waveguide (20) as shown comprises a block (22) of crystalline material into which are embedded sections (24), (25), (26), (27) and (28), all of another crystalline material. Normally at least one, and preferably both of the materials has nonlinear optical properties. The sections (24), (25), (26), (27) and (28) are aligned between the top of the article (30) and the bottom of the article (32), such that said embedded sections along with the portions of block (22) aligned therewith comprise a waveguide. The waveguide is designed so that during operation, incident beams of optical waves enter the waveguide at the upper surface (34) of section (24) at the top (30) of the article (20). The incident beams are aligned so that optical waves pass through each of the embedded sections (24), (25), (26), (27) and (28) as well as sections represented by the portions of block (22) in alignment with said embedded sections, and then exit from the bottom (32) of block (22).

Figure 3:
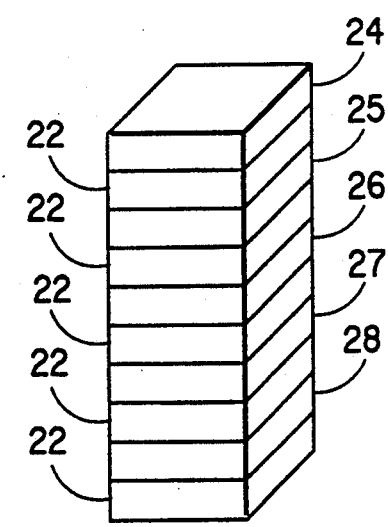
FIG. 3 is a perspective view of the aligned sections of nonlinear optical material provided by the waveguide of FIG. 2.

Accordingly, as further illustrated by FIG. 3, the waveguide embodied by FIG. 2 is designed so that beams passing therethrough, pass through a number of sections comprised of one material represented by blocks (24), (25), (26), (27) and (28), and an equal number of sections comprised of another material represented by the portions at block (22) in alignment therewith.

A means of preparing a channel waveguide of the type illustrated in FIGS. 2 and 3 in accordance with this invention is to modify a single crystal substrate of the formula $K_{1-x}Rb_xTiOMO_4$, wherein x is from 0 to 1 and M is P or As or a single crystal substrate of said formula where the cations of said formula have ben partially replaced by at least one of Rb+, Tl+ and Cs+. Preferably the cation exchange provides at least about 0.00025 difference between the surface index of refraction of cation exchanged sections and the surface index of refraction of the substrate. Preferred substrates are those of said formula. Use of these substrates for producing channel waveguides is well known in the art, and reference is made to U.S. Pat. No. 4,740,265 and U.S. Pat. No. 4,766,954 which are both hereby incorporated herein in their entirety. A typical substrate for use in producing waveguides is a crystal of $KTiOPO_4$, where x is 0 and M is P (i.e., "KTP").

As described in U.S. Pat. No. 4,740,265 and U.S. Pat. No. 4,766,954, the use of substrate masking allows replacement of cations of one optically smooth surface by ions selected from at least one of Rb+ and Cs+ and Tl+ and a resulting change in the surface index of refraction with respect to the index at refraction of the starting substrate. In accordance with the instant invention, areas along the portion of the crystal substrate surface used for forming the desired channel may be alternately masked and unmasked during cation replacement so that the resulting channel consists of a series of aligned sections which alternate between original substrate (e.g., $KTiOPO_4$) and substrate material in which cations have been replaced, (e.g., $K_{1-x}Rb_xTiOPO_4$ where x is not zero). Standard photolithographic techniques may be used to provide the desired masking. For example, a mask of protective material (e.g., Ti) may be applied over the surface of the crystal substrate with a pattern generated therein to allow, upon suitable exposure to a molten salt, formation of sections of a second optical material by cation exchange. After cation replacement the remaining protective material may be removed.

One process for preparing a channel waveguide for a wavelength conversion system in accordance with this invention comprises the steps of: (1) providing a z-cut substrate of crystalline material (i.e., a single crystal) having the formula $K_{1-x}Rb_xTiOMO_4$ wherein x is from zero to one and M is P or As, said substrate including an optically smooth surface with a selected portion at which it is suitable to form a channel waveguide; (2) providing a molten salt containing cations selected from the group consisting of Rb+, Cs+ and Tl+ in an amount efficient to provide upon exposure to said waveguide portion at a selected temperature for a selected time sufficient cation replacement to change the index of refraction with respect to the index of refraction of said substrate; (3) applying a masking material on said substrate to provide a pattern of aligned areas along said waveguide portion of said optically smooth surface which are alternately masked with a material resistant to said molten salt and unmasked; (4) immersing said masked substrate in said molten salt at said selected temperature for said selected time, thereby providing cation replacement in said unmasked areas; (5) removing the masking material from said substrate; and (6) finishing said substrate to provide a clean waveguide with polished waveguide input and output faces. In this process the length of said masked and unmasked areas is selected such that after said cation replacement in the unmasked areas, a channel waveguide is provided at said portion which comprises at least one optical conversion segment consisting of a series of aligned sections of optical materials; and such that the sum for the series of section of the product of the length of each section and the $\Delta k$ for that section is equal to about zero, and the length of each section is less than its coherence length; wherein the $\Delta k$ for each section is the difference between the sum of the propagation constants for the incident waves for the wavelength conversion system in that section and the sum of the propagation constant for the generated waves for said wavelength conversion system in that section, and the coherence length for each section is $$\frac{2\pi}{\Delta k}$$

for that section. Thallium containing substrates (i.e., substrates of the formula $K_{1-x}Rb_xTiOMO_4$ wherein the cations of said formula have been partially replaced by Tl+) are also considered suitable. $KTiOMO_4$ (i.e., x is zero and M is P) is a preferred substrate.

KTP substrates may be provided in accordance with step (1) by cutting and polishing a 1 mm thick z-cut substrate (i.e., to provide a single crystal with an optically smooth surface). A masking of Ti may be provided in accordance with step (3) in conformance with standard photolithographic techniques by sequentially applying Ti on the substrate; applying a photoresist material over the Ti and curing the photoresist; providing a photomask having the desired pattern and contact exposing the photoresist through the photomask; removing the exposed portion of the photoresist; and etching away the Ti beneath the removed photoresist; and removing the unexposed photoresist, so that the patterned Ti masking remains. Typically, the substrate will be end polished before it is immersed in the molten salt; and washed after removal of the salt. Typically the substrate is finished in accordance with step (6) by polishing it. After the Ti mask is removed, the waveguide may be suitably mounted so that a laser beam may be directed therein.

It should be recognized that the $\Delta k$ for each section in which cations have been exchanged in accordance with this process for waveguide preparation can be varied somewhat by changing the section width and/or depth, and may also vary somewhat as a function of replacement ion type and concentration. Accordingly, one may wish to prepare a number of waveguides having various widths, etc. to determine optimum design for a particular wavelength conversion system using particular materials.

Figure 7:
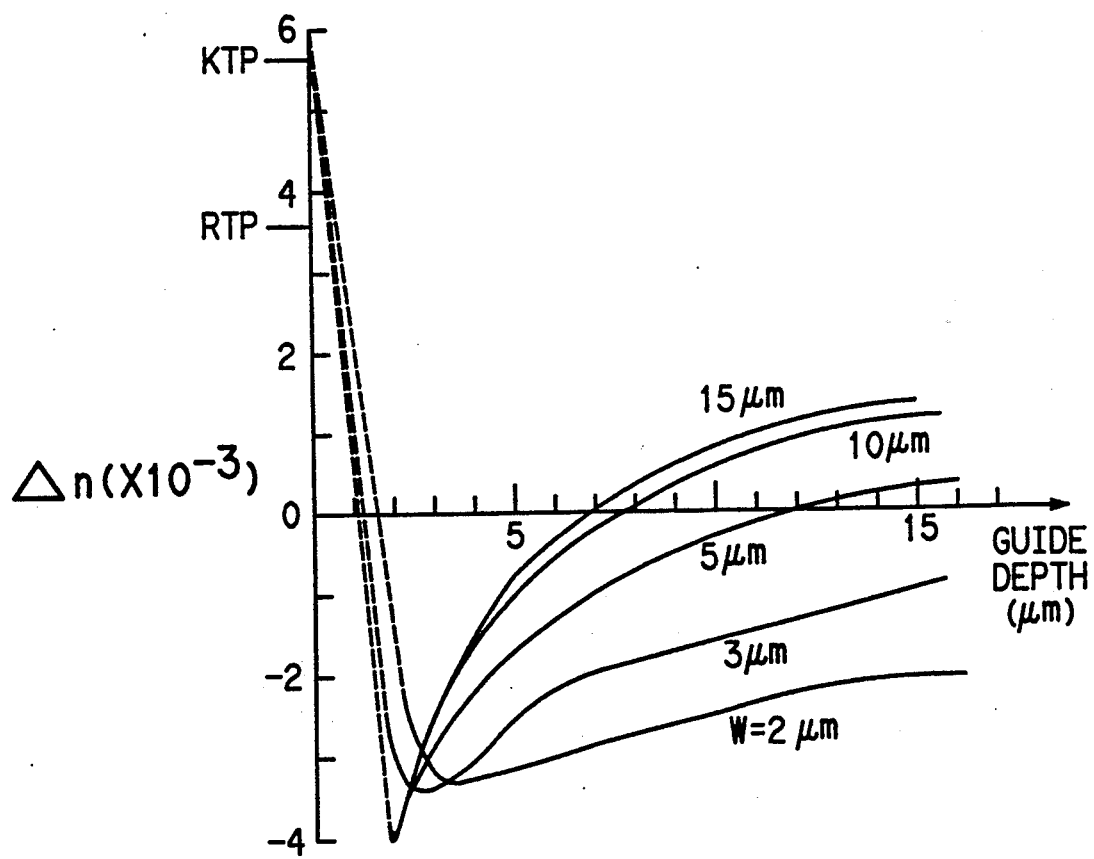
FIG. 7 is an illustrative plot of a calculated relationship between depth and refractive index mismatch for different waveguide widths.

To further illustrate the processing latitude afforded by this invention and the relationship between waveguide depth and refractive index mismatch, $\Delta n$, one skilled in the art can calculate the refractive index mismatch, i.e., $\Delta n$, for second harmonic generation in $KTiOPO_4$ (KTP) with y-propagation (i.e., $\Delta n = 0.5 (n_x(\omega) + n_z(\omega)) - n_x(2\omega)$, where $n_x(\omega)$ and $n_z(\omega)$ are respectively the effective refractive indexes of the incident optical wave of frequency $\omega$ for x polarization and z polarization and $n_x(2\omega)$ is the effective refractive index of the generated optical wave of frequency $2\omega$ for x polarization) as a function of guide depth for various waveguide widths, using the methods described in M. J. Adams, "An Introduction to Optical Waveguides", (John Wiley & Sons, N.Y. 1981). Using this approach the effective mode indices for the lowest order spatial modes at $\lambda = 0.532$ and 1.064 $\mu$m were calculated. In the calculation, an exponential index profile in the depth direction was assumed. The refractive indices used for KTP are $n_x = 1.7399$ and $n_z = 1.8296$ at $\lambda = 1.064$ $\mu$m and $n_x = 1.779$ at $\lambda = 0.532$ $\mu$m, as disclosed in J. D. Bierlein and H. Vanherzeele, J. Opt. Soc. Am., B, 6, 622–633 (1989). For planar Rb-exchanged waveguides the surface index has been measured to be $n_x=1.7644$, $n_z=1.8511$ at $\lambda=1.064$ μm and $n_x=1.8042$ at $\lambda=0.532$ μm. The result of the calculation is shown in FIG. 7. At zero waveguide depth, the $\Delta n$ equals the bulk KTP substrate value for y-propagation. The corresponding coherence length is 92 μm. For the Rb-exchanged guides, the cutoff for 1.064 μm wavelength is at a depth of 2.0 μm. At infinite depth the $\Delta n$ would correspond to that for bulk RbTiOPO$_4$ (RTP). A minimum occurs in the 2 to 3 μm depth range, which is near the range for the waveguides prepared in accordance with this invention (see Example 1 herein below). For a depth of 4 μm and width (W) of 5 μm, from FIG. 7, $\Delta n_1$ (i.e., the $\Delta n$ for the cationically exchanged sections)$= -0.0022$ and $\Delta n_2$ (i.e., the $\Delta n$ for the KTP sections)$=0.0058$. With the length of the KTP sections, $h_2=1.3$ μm phase matching would be predicted to occur in accordance with the teachings of this invention when the length of the cationically exchanged sections, $h_1=3.4$ μm, which is in substantial agreement with the actual experimental value found in Example 1 below (i.e., 4 μm).

FIG. 7 illustrates the practical advantage of using waveguides segmented in accordance with the teachings of this invention relative to uniform waveguides for achieving phase matching for second harmonic generation. Since a minimum occurs in the $\Delta n$ vs. depth curve, near this minimum very little change in $\Delta n$ is expected with changes in processing conditions, such as exchange time or temperature, which change guide depth. Selecting this minimum, phase matching is achieved by adjusting the length of each section of the optical conversion segment such that $h_1\Delta n_1 + h_2\Delta n_2$ is about equal to zero. In contrast, for a uniform waveguide, i.e., a waveguide without the segmented structure taught in this invention, where phase matching requires that $\Delta n$ be about equal to zero throughout the entire waveguide, one is not free to select the guide depth and, as a result, a small processing change affecting waveguide depth will give a much larger change in $\Delta n$ and, hence, processing latitude will be much narrower. Another advantage of using waveguides segmented in accordance with this invention is that these waveguides permit noncritical phase matching even though phase matching at 1.064 μm in bulk KTP is critical.

Figure 4:
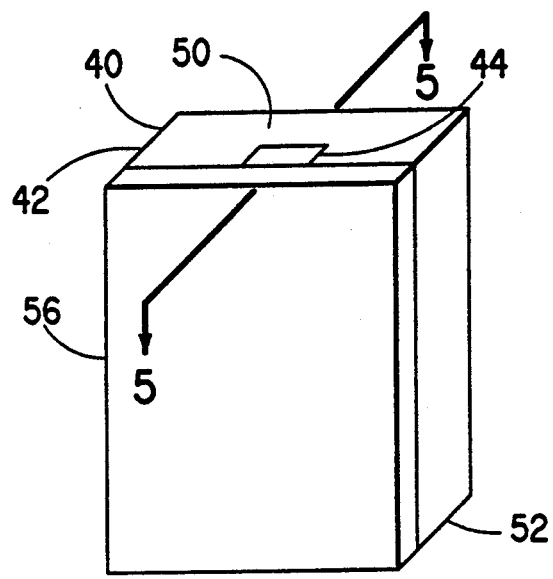
FIG. 4 is a perspective view of another waveguide for wavelength conversion in accordance with this invention.
Figure 5:
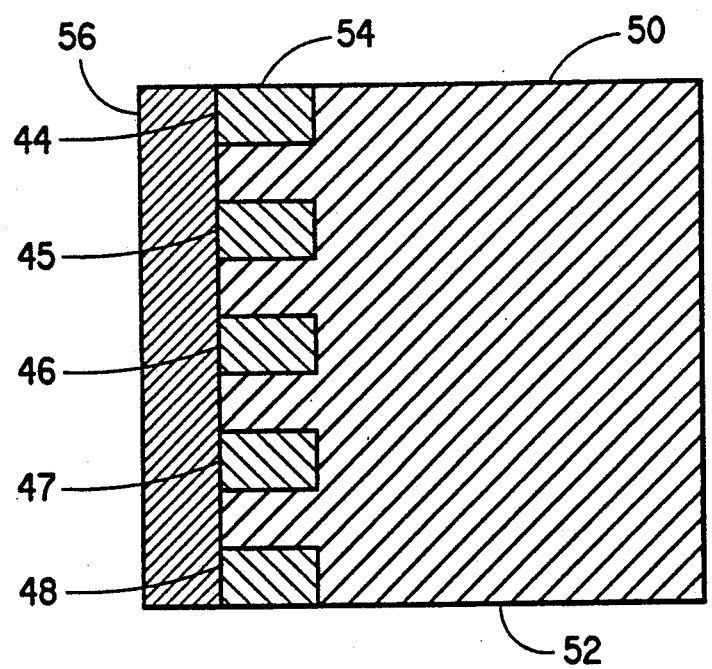
FIG. 5 is a section view along section 5—5 of FIG. 4.

Another embodiment of a device for wavelength conversion is illustrated at FIGS. 4 and 5.

The waveguide device (40) as shown comprises a block (42) of linear crystalline material into which are embedded sections (44), (45), (46), (47) and (48), all of another linear crystalline material. The sections (44), (45), (46), (47) and (48) are aligned between the top of the article (50) and the bottom of the article (52), such that said embedded sections along with the portions of the block (42) aligned thereby comprise a waveguide. A film of nonlinear optical material (56) is provided in device (40) adjacent to the waveguide of linear optical materials. The waveguide device is designed so that during operation, the incident beams of optical waves enter the waveguide at the upper surface (54) of section (44) at the top (50) of the device (40). The incident beams are aligned so that optical waves pass through each of the embedded sections (44), (45), (46), (47) and (48) as well as sections represented by the portions of the block (42) in alignment with said embedded sections, and then exit from the bottom (52) of the block (42). As the optical waves pass through the embedded sections and said portions of block (42) in alignment therewith, the evanescent component of the incident beam couples into the film (56) wherein waves of a different wavelength are generated; and the evanescent component of the waves generated in the film (56) is coupled back into the aligned sections of linear optical material.

Waveguide devices having a film of nonlinear optical material as illustrated in FIGS. 4 and 5 may be prepared by modifying a single crystal substrate to provide an optically smooth surface thereof, a channel consisting of a series of aligned sections which alternate between original substrate material and another optical material; and after the channel has been provided, providing a thin organic film along the surface by the Langmuir-Blodgett method. One method of providing a thin organic film includes spreading a monolayer of an amphiphillic compound that possesses a large hyperpolarizability on the water surface in a Langmuir trough, and compressing the monolayer to a suitable surface density (or surface pressure). By repetitively dipping and withdrawing the segmented waveguide substrate into and out of the monolayer-clad water while keeping the surface density (pressure) constant, the molecules may be transferred, monolayer by monolayer, to the segmented waveguide surface. The thickness of an LB film is controlled by the number of dipping-withdrawing cycles. LB films consisting of alternate monolayers of two compounds may also be obtained by using two Langmuir troughs—each covered with a monolayer of one compound. (See, M. Sugi, Langmuir-Blodgett films—a Course Toward Molecular Electronics: a Review, Journal of Molecular Electronics, Vol. 1, 2–17 (1985) and U.S. Pat. No. 4,792,208).

Practice of the invention will become further apparent from the following non-limiting Examples.

EXAMPLE 1

A hydrothermally grown KTP crystal (obtained from the Airtron Division of Litton Systems) was first cut into approximately 1 mm thick z-plates, polished and coated with about 1000 Å of Ti by thermal evaporation. A photoresist (Shipley #140J) was spin coated onto the Ti and heat cured for about 1 hour at 110° C. The cured photoresist was then contact exposed through a photomask containing the desired waveguide patterns. The exposed photoresist was removed and the Ti coating revealed beneath the removed photoresist was chemically etched using a solution of EDTA, $H_2O_2$ and $NH_4OH$ so that the KTP substrate was selectively revealed. The remaining photoresist was then removed and the Ti-masked substrates were end polished.

A series of periodic waveguide patterns were generated in the Ti mask for the purposes of allowing preparation of Rb-exchanged waveguide sections alternately with sections of the bulk KTP. The masked substrates provided 36 different waveguide patterns having in the order about 400 to 1000 sections. These patterns consisted of open areas with widths that vary in 1 μm steps from 4 to 9 μm and, in the beam propagation direction, again in 1 μm step lengths ranging from 1.7 to 4.7 μm with 1.3 μm Ti separations, i.e., segmented waveguide periods of from 3 to 6 μm. The waveguides were oriented for y propagation in the KTP.

The masked substrates were end polished to give a total guide length of approximately 5 mm and ion exchanged in a molten salt bath consisting of 3 mole %

Ba(NO$_3$)$_2$:97 mole % RbNO$_3$ at a temperature of 330° C. Several channel depths were studied by systematically varying the exchange time from 45 to 90 minutes. This ion exchange process results in Rb channel waveguides with characteristic depths that range from about 3 to 4 μm. After exchange, the Ti mask was removed.

The second harmonic generation conversion efficiency was measured using endfire coupling of a cw diode pumped randomly polarized 48 mw, 1.064 μm Nd:yttrium-aluminum-garnet (YAG) laser through a 10 X, 0.25 NA objective. The coherence length for the KTP section for this wavelength conversion system was considered about 91 μm and the coherence length for the Rb exchange sections of this wavelength conversion was considered to be about 190 μm.

The measured second harmonic generation output as a function of guide width for a guide period of 4 μm and ion exchange time of 90 minutes showed Type II phase matching having a peak in the second harmonic generation output near a 6 μm guide width with a peak width (FWHM) of less than 1.5 μm.

Examination of the weak scattering from the guide surface showed the second harmonic generation to increase continually with propagation distance indicating that, for this guide, the overall coherence length was greater than the guide length and phase matching thus was demonstrated. Based upon this observation, the sum of the Δkh for the sections over the entire waveguide was determined to be less than π. For other waveguide patterns, having different widths and periods and orders of magnitude lower second harmonic generation conversion efficiencies, several coherence lengths were observed and phase matching was not achieved for this wavelength.

The maximum conversion efficiency observed measured was 15±4%/W/cm$^2$.

The temperature of the waveguide exhibiting phase matching was varied and phase matching was demonstrated for room temperature (i.e., about 25° C. to about 125° C.) (i.e., a range of about 100° C.).

EXAMPLE 2

A flux grown KTP crystal was obtained from China (Research Institute for Crystal Growth, Beijing) and was cut, polished and masked using a process, propagation direction and mask generally in accordance with the procedure of Example 1. This sample was treated in a RbNO$_3$ molten salt bath at 370° C. for 45 minutes. (The ionic conductivity of flux grown KTP is significantly (100X−1000X) larger than hydrothermally grown KTP and hence the processing conditions are different). Of the various patterns, phase matched second harmonic generation at 1.064 μm was observed for a guide width of 6 μm and a guide period of 5 μm. This conversion efficiency was about 8%/W/cm$^2$.

EXAMPLE 3

A hydrothermally grown KTP crystal (obtained from Airtron Division of Litton Systems) was prepared using the same cutting, polishing and masking process as for Example 1 except that the mask was oriented for x-propagation rather than y-propagation. This sample was treated in a RbNO$_3$:TlNO$_3$:Ba(NO$_3$)$_2$ bath of mole ratio 95:4:1 at 360° C. for 1 hour. Phase matched SHG at 1.319 μm (Nd:YAG) was observed for a 7 μm guide width with a 4 μm pitch, (i.e., use of the bath containing Tl adjusted the waveguide surface refractive index for phase matching at 1.319 μm rather than 1.064 μm).

Particular embodiments of the invention are included in the examples. Other embodiments will become apparent to those skilled in the art from a consideration of the specification or practice of the invention disclosed herein. It is understood that modifications and variations may be practical without departing from the spirit and scope of the novel concepts of this invention. It is further understood that the invention is not confined to the particular formulations and examples herein illustrated, but it embraces such modified forms thereof as come within the scope of the following claims.

What is claimed is:

1. A process for wavelength conversion comprising the step of directing the incident optical waves for wavelength conversion through a series of aligned sections of optical materials for wavelength conversion, said sections being selected such that the sum for the series of sections of the product of the length of each section in the direction of alignment and the Δk for that section is equal to about zero, and such that the length of each section is less than its coherence length; wherein the Δk for each section is the difference between the sum of the propagation constants for the incident waves for the wavelength conversion system in that section and the sum of the propagation constant for the generated waves for the wavelength conversion system in that section, and the coherence length for each section is $$\frac{2\pi}{\Delta k}$$

for that section; and wherein either at least one of said materials is optically nonlinear or a layer of nonlinear optical material is provided adjacent to said series during wavelength conversion, or both.

2. A process for wavelength conversion in accordance with claim 1 wherein a Langmuir-Blodgett film is provided adjacent to said series during wavelength conversion.

3. The process for wavelength conversion in accordance with claim 1 wherein each section is constructed of nonlinear optical materials.

4. A process for wavelength conversion in accordance with claim 3 wherein incident waves of frequencies $\omega_1$ and $\omega_2$ are used to generate waves of frequency $\omega_3$; and wherein $\omega_3$ is equal to the sum of $\omega_1$ and $\omega_2$.

5. A process for wavelength conversion in accordance with claim 3 wherein incident waves of frequency $\omega_4$ is used to generate waves of frequencies $\omega_5$ and $\omega_6$; and wherein $\omega_4$ is equal to the sum of $\omega_5$ and $\omega_6$.

6. A process for wavelength conversion in accordance with claim 3 wherein second harmonic waves of the incident optical waves are generated.

7. A process for wavelength conversion in accordance with claim 3 wherein the aligned sections are pairs of adjacent sections of optical materials selected such that for each pair the sum of the product of the length of one section and its Δk together with the product of the length of the other section and its Δk is about zero.

8. A process for wavelength conversion in accordance with claim 7 wherein incident waves having a wavelength of 1.064 μm are used to generate second harmonic waves, and wherein the optical waves are directed through a waveguide having alternating sections of KTP and rubidium exchanged KTP.

9. A process for second harmonic generation in accordance with claim 8 wherein the waveguide width is about 6 μm, the length of each KTP section is about 1.3 μm and the length of each rubidium exchanged section is about 2.7 μm; and wherein the KTP is hydrothermally grown.

10. A process for wavelength conversion in accordance with claim 3 wherein the length of each section is in the range of 0.25 μm to 50 μm.

11. A process for wavelength conversion comprising the step of directing the incident optical waves for wavelength conversion through a wavelength conversion path having a series of aligned sections of optical materials for wavelength conversion; at least one of said optical materials having a Δk which is positive for said wavelength conversion; at least one of said optical materials having a Δk which is negative for said wavelength conversion; and the series of sections being selected such that the sum of the products of the lengths of each section of material having a positive Δk with its Δk is balanced with the sum of the products of the lengths of each section of material having a negative Δk with its Δk so that the overall coherence length over the wavelength conversion path is greater than the length of the wavelength conversion path.

12. An optical article for use in a wavelength conversion system, said optical article comprising at least one optical conversion segment consisting of a series of aligned sections of optical materials for wavelength conversion, wherein said sections are selected so that the sum of the product of the length of each section and the Δk for that section is equal to about zero, and the length of each section is less than its coherence length; wherein the Δk for each section is the difference between the sum of the propagation constants for the incident waves for the wavelength conversion system in that section and the sum of the propagation constant for the generated waves for the wavelength conversion system in that section, and the coherence length for each section is $$\frac{2\pi}{\Delta k}$$

for that section; and wherein either at least one of said materials is optically nonlinear or said article thereby comprises a layer of nonlinear optical material adjacent to said segment, or both.

13. An optical article in accordance with claim 12 wherein a Langmuir-Blodgett film is provided adjacent to said segment.

14. The optical article in accordance with claim 12 wherein each section is constructed of nonlinear optical materials.

15. An optical article in accordance with claim 14 wherein the aligned sections are pairs of adjacent sections of optical materials selected such that for each pair the sum of the product of the length of one section and its Δk together with the product of the length of the other section and its Δk is about zero.

16. An optical article in accordance with claim 15 having alternating sections of KTP and rubidium exchanged KTP.

17. An optical article in accordance with claim 16 wherein said sections form a waveguide having a width of about 6 μm; wherein the length of each KTP section is about 1.3 μm and the length of each rubidium exchanged section is about 2.7 μm; and wherein the KTP is hydrothermally grown.

18. An optical article in accordance with claim 14 wherein the length of each section is in the range of 0.25 μm to 50 μm.

19. An optical article in accordance with claim 12 which is a waveguide comprising alternating sections of a crystalline substrate having the formula $K_{1-x}Rb_xTiOMO_4$ wherein x is from zero to one and M is P or As, and sections of substrate material in which the cations of said substrate have been replaced by sufficient cations selected from the group consisting of $Rb^+$, $Cs^+$ and $Tl^+$ to change the surface index of refraction with respect to the index of refraction of said substrate.

20. An optical article in accordance with claim 14 comprising alternating sections of single crystal KTiOPO$_4$ substrate and sections of substrate material in which the cations of said substrate are partially replaced by Rb.

21. An optical article in accordance with claim 14 comprising alternating sections of single crystal KTiOPO$_4$ substrate and sections of said substrate material wherein the cations are partially replaced by $Tl^+$ and $Rb^+$.

22. An optical article in accordance with claim 12 wherein the optical materials are single crystal materials having the formula $K_{1-x}Rb_xTiOMO_4$ wherein x is from 0 to 1 and M is selected from P and As, and single crystal materials of said formula where the cations have been replaced by at least one of $Rb^+$, $Tl^+$ and $Cs^+$.

23. An optical article in accordance with claim 22 which is a modified single crystal of KTiOPO$_4$ containing sections where the cations of KTiOPO$_4$ have been partially replaced by at least one of $Rb^+$ and $Tl^+$.

24. In an optical waveguide device comprising at least one channel waveguide, means to couple an incoming optical wave into said channel waveguide and means to couple an outgoing wave out of said channel waveguide, the improvement wherein the channel waveguide is an optical article as provided in claim 12.

25. A process for preparing a channel waveguide for a wavelength conversion system comprising the steps of:
(1) providing a z-cut substrate of crystalline material having the formula $K_{1-x}Rb_xTiOMO_4$ wherein x is from zero to one and M is P or As or crystalline material having said formula wherein the cations have been partially replaced by $Tl^+$, said substrate including an optically smooth surface with a selected portion at which it is suitable to form a channel waveguide;
(2) providing a molten salt containing cations selected from the group consisting of $Rb^+$, $Cs^+$ and $Tl^+$ in an amount efficient to provide upon exposure to said waveguide portion at a selected temperature for a selected time sufficient cation replacement to change the index of refraction with respect to the index of refraction of said substrate;
(3) applying a masking material on said substrate to provide a pattern of aligned areas along said waveguide portion of said optically smooth surface which are alternately masked with a material resistant to said molten salt and unmasked;
(4) immersing said masked substrate in said molten salt at said selected temperature for said selected time, thereby providing cation replacement in said unmasked areas;

(5) removing the masking material from said substrate; and
(6) finishing said substrate to provide a clean waveguide with polished waveguide input and output faces;

the length of said masked and unmasked areas being selected such that after said cation replacement in the unmasked areas, a channel waveguide is provided at said portion which comprises at least one optical conversion segment consisting of a series of aligned sections of optical materials; and such that the sum for the series of sections of the product of the length of each section and the $\Delta k$ for that section is equal to about zero, and the length of each section is less than its coherence length; wherein the $\Delta k$ for each section is the difference between the sum of the propagation constants for the incident waves for the wavelength conversion system in that section and the sum of the propagation constant for the generated waves for said wavelength conversion system in that section, and the coherence length for each section is $$\frac{2\pi}{\Delta k}$$

for that section.

26. The process of claim 25 wherein the substrate of step (1) has the formula $K_{1-x}Rb_xTiOMO_4$.

* * * * *